United States Patent
Wang et al.

(10) Patent No.: US 9,984,286 B2
(45) Date of Patent: May 29, 2018

(54) METHOD AND APPARATUS FOR DETECTING PERSONS, AND NON-TRANSITORY COMPUTER-READABLE RECORDING MEDIUM

(71) Applicants: Xin Wang, Beijing (CN); Shengyin Fan, Beijing (CN); Qian Wang, Beijing (CN); Jiadan Zhu, Beijing (CN)

(72) Inventors: Xin Wang, Beijing (CN); Shengyin Fan, Beijing (CN); Qian Wang, Beijing (CN); Jiadan Zhu, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 209 days.

(21) Appl. No.: 15/148,391

(22) Filed: May 6, 2016

(65) Prior Publication Data

US 2016/0335490 A1  Nov. 17, 2016

(30) Foreign Application Priority Data

May 12, 2015 (CN) .......................... 2015 1 0237672

(51) Int. Cl.
   *G06K 9/00* (2006.01)
   *G06K 9/62* (2006.01)
   *G06T 7/00* (2017.01)

(52) U.S. Cl.
   CPC ..... *G06K 9/00369* (2013.01); *G06K 9/00778* (2013.01)

(58) Field of Classification Search
   CPC .................. G06K 9/00369; G06K 9/00778
   See application file for complete search history.

(56) References Cited

U.S. PATENT DOCUMENTS 8,401,232 B2  3/2013  Fan et al.
8,896,657 B2  11/2014  Wang et al.
(Continued)

FOREIGN PATENT DOCUMENTS

CN  105654021  6/2016

OTHER PUBLICATIONS

Wang et al. "Crowd Density Estimation Based on Local Binary Pattern Co-Occurrence Matrix." IEEE International Conference on Multimedia and Expo Workshops, Jul. 9, 2012, pp. 372-377.*

(Continued)

*Primary Examiner* — Jon Chang
(74) *Attorney, Agent, or Firm* — Harness, Dickey & Pierce, P.L.C.

(57) ABSTRACT

A method and an apparatus for detecting persons are disclosed. The method includes initially detecting the persons in a height-top-view; dividing the height-top-view into one or more regions, and estimating crowd density in each region; determining, based on the crowd density, visible regions of the initially detected persons in each of the regions; for each of the initially detected persons, extracting a first gradient feature and a second gradient feature of the person from the height-top-view, and a grayscale image or a color image corresponding to the height-top-view, respectively; for each of the initially detected persons, determining, based on the extracted first gradient feature and second gradient feature, using a previously constructed classifier corresponding to the determined visible region of the person, a confidence level of the initially detected person; and correcting, based on the confidence level, a detection result of the initially detected persons.

11 Claims, 8 Drawing Sheets

(56) References Cited

U.S. PATENT DOCUMENTS

| | | |
|---|---|---|
| 9,142,011 B2 | 9/2015 | Fan et al. |
| 2014/0079282 A1* | 3/2014 | Marcheselli ....... G06K 9/00335 |
| | | 382/103 |
| 2014/0177915 A1 | 6/2014 | Fan et al. |
| 2014/0218483 A1 | 8/2014 | Wang et al. |
| 2014/0270358 A1* | 9/2014 | Zhu .................... G06K 9/00369 |
| | | 382/103 |
| 2015/0371398 A1 | 12/2015 | Qiao et al. |
| 2016/0133025 A1* | 5/2016 | Wang ................. G06K 9/00778 |
| | | 348/135 |

OTHER PUBLICATIONS

Fradi et al. "Crowd Density Analysis Using Subspace Learning on Local Binary Pattern." IEEE International Conference on Multimedia and Expo Workshops, Jul. 15, 2013, 6 pages.*

Anuj Mohan et al., "Example-Based Object Detection in Images by Components", IEEE Transactions on Pattern Analysis and Machine Intelligence, vol. 23, No. 4, Apr. 2001, pp. 349-361.

Wenhua Ma et al., "Advanced Local Binary Pattern Descriptors for Crowd Estimation", 2008 IEEE Pacific-Asia Workshop on Computational Intelligence and Industrial Application, pp. 958-962.

Mikel Rodriguez et al., "Density-aware person detection and tracking in crowds" IEEE Int. Conf. on Computer Vision, Nov. 2011, pp. 2423-2430.

Michael Harville, "Stereo Person Tracking with Adaptive Plan-View Templates of Height and Occupancy Statistics" Image and Vision Computing, vol. 22, Issue 2, Feb. 2004, pp. 127-142.

Alex Rodriguez et al., "Clustering by fast search and find of density peaks", Science, vol. 344, Issue 6191, Jun. 2014, pp. 1492-1496.

* cited by examiner

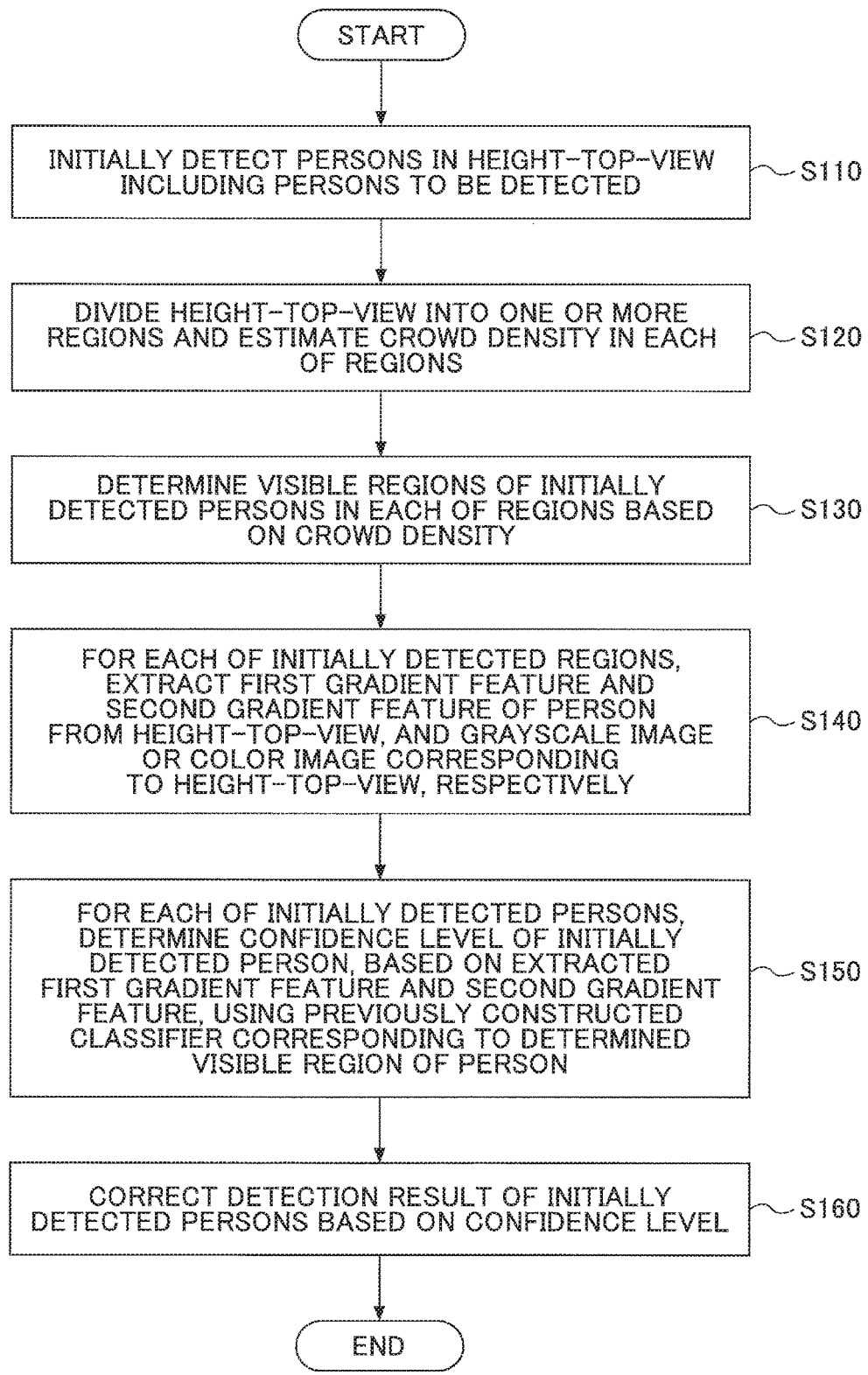

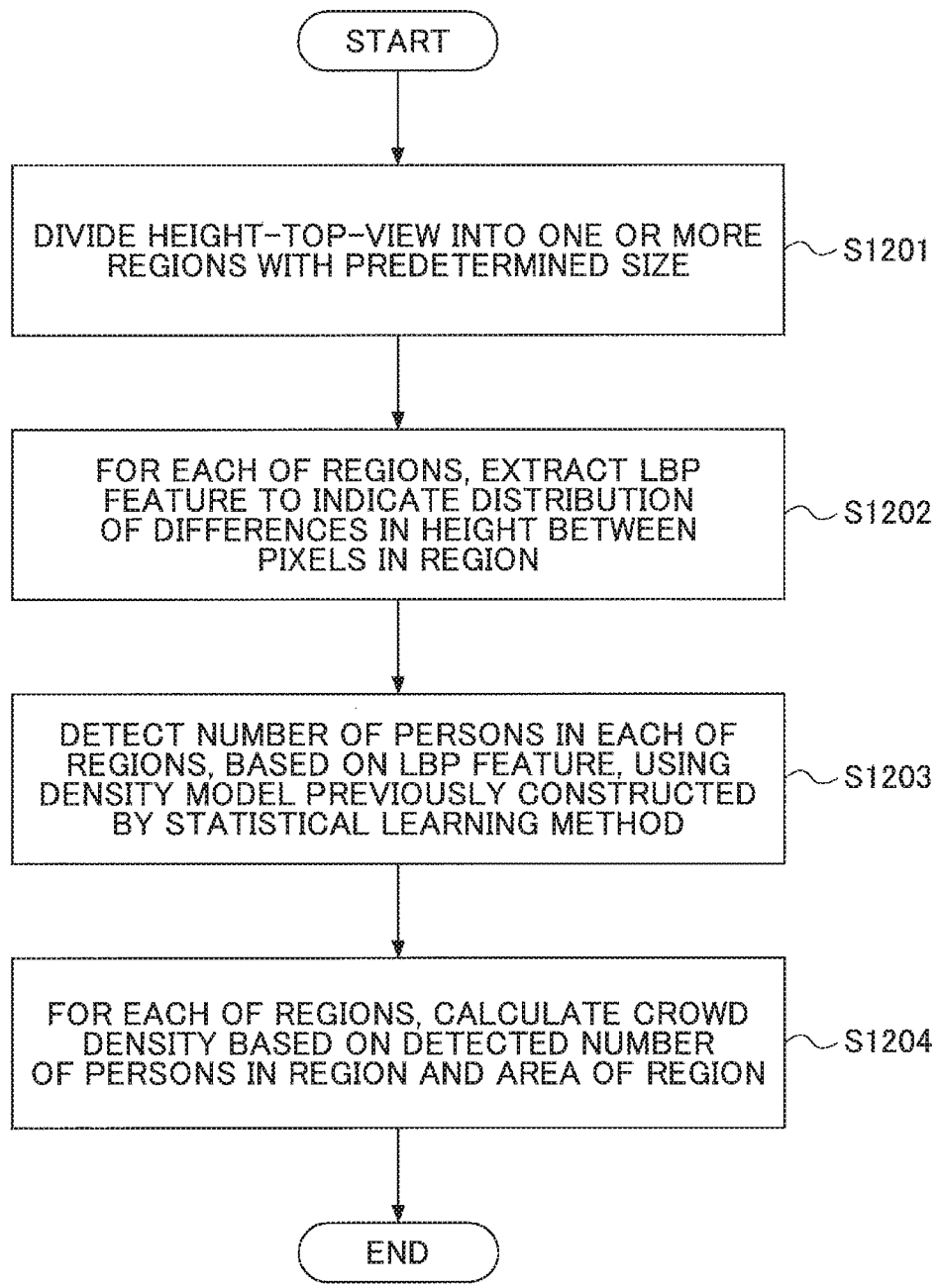

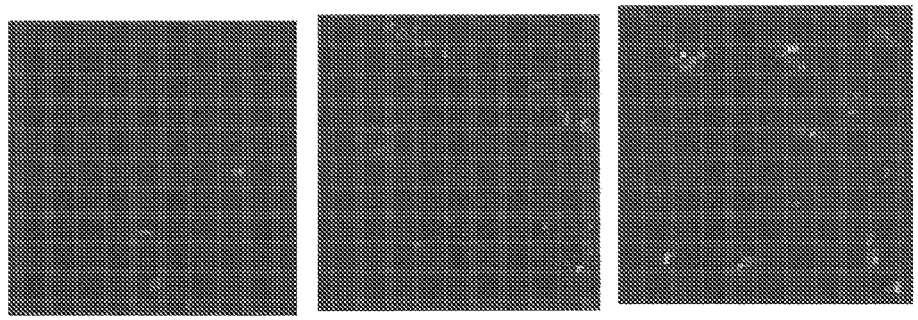
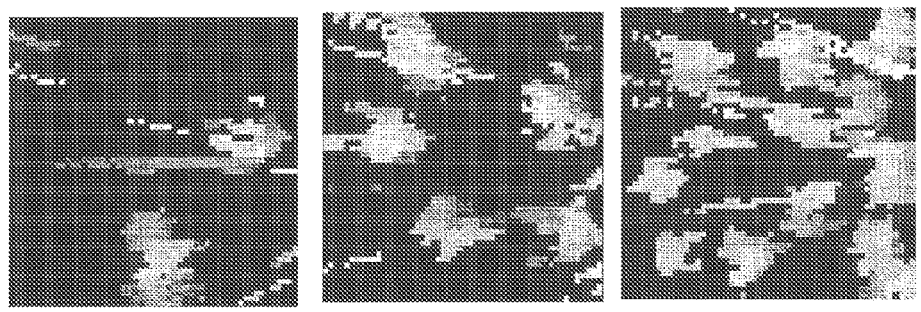
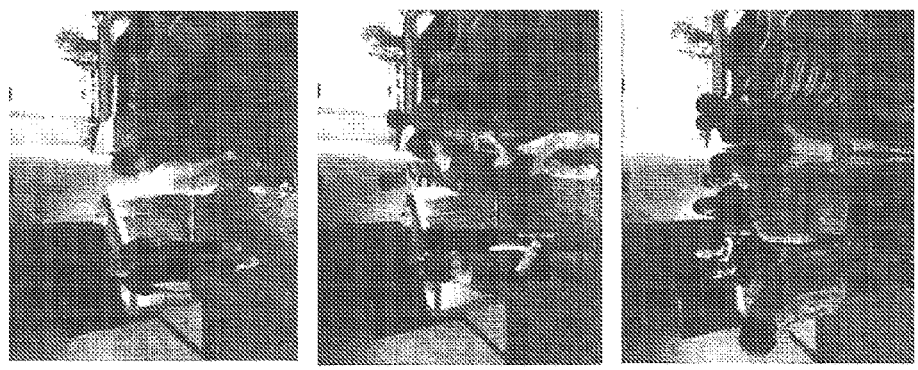

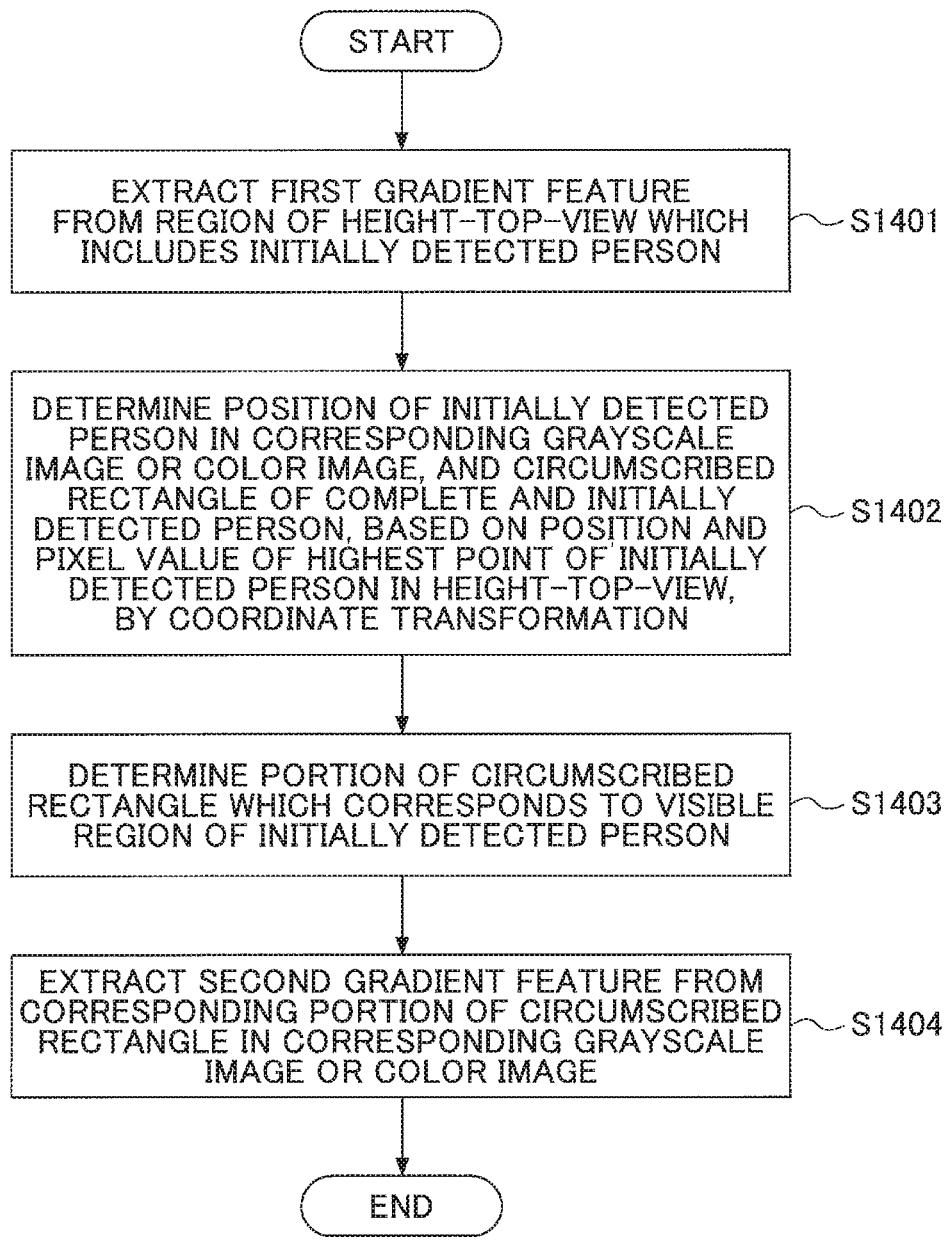

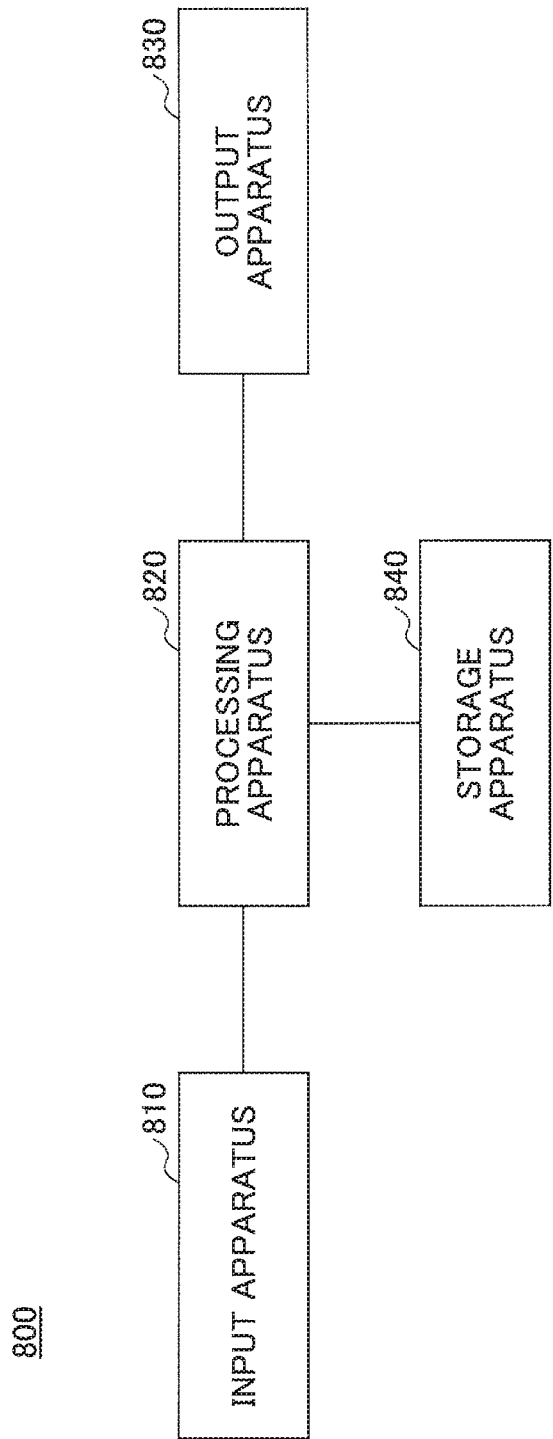

METHOD AND APPARATUS FOR DETECTING PERSONS, AND NON-TRANSITORY COMPUTER-READABLE RECORDING MEDIUM

BACKGROUND OF THE INVENTION

1. Field of the Invention

The present invention generally relates to image processing, and particularly, a method and an apparatus for detecting persons.

2. Description of the Related Art

Although detection of a person in the field of machine vision has been researched for a long time and great progress has been made, such technology still cannot satisfy the practical requirements. One important reason is that the detection effects of many conventional detection methods are significantly reduced due to the shielding in a crowded environment. According to statistics, a detection rate of persons may reach 95% in a normal uncrowded scene, and the detection rate of persons is often less than 70% in a crowded scene.

For the problems of an undesirable detection effect in a crowded environment, some research has been performed and some solutions have been provided. As a main solution, detection is performed using a Deformable Parts Model, and the core concept of the solution is to respectively perform training and detection for parts of a human body. As an example of this solution, in the article of PAMI 2012, for which the author is A. Mohan, and the title is "Example-based object detection in images by components", a 2-stages method is provided. Such a method includes respectively performing training for detectors of the head, the arms and the legs, and using the detectors determining whether a roughly detected result matches a corresponding mode. This method is relatively robust for the shielding, however the detection performance may decrease when a detection scene is a scene that is not included in a training set.

Another solution is a density estimation method based on regression. For example, as an example of this solution, in an article published in 2008, for which the author is Wenhua Ma, and the title is "Advanced Local Binary Pattern Descriptors for Crowd Estimation", the number of persons is estimated by learning an image bottom-layer feature and mapping of crowd density. However, this method can estimate only the crowd density, and cannot obtain position information of persons.

SUMMARY OF THE INVENTION

In view of the above problems, the present invention is provided. Specifically, the present invention has an object to provide technology of detecting persons that can accurately detect each of the persons, even when shielding degrees of human bodies are different due to different crowdedness degrees of regions in a detection range.

According to an aspect of an embodiment of the present invention, a method for detecting persons includes initially detecting the persons in a height-top-view including the persons to be detected; dividing the height-top-view into one or more regions, and estimating crowd density in each of the regions; determining, based on the crowd density, visible regions of the initially detected persons in each of the regions; for each of the initially detected persons, extracting a first gradient feature of the person from the height-top-view and a second gradient feature of the person from a grayscale image or a color image corresponding to the height-top-view, respectively; for each of the initially detected persons, determining, based on the extracted first gradient feature and second gradient feature, using a previously constructed classifier corresponding to the determined visible region of the person, a confidence level of the initially detected person; and correcting, based on the confidence level, a detection result of the initially detected persons.

According to another aspect of an embodiment of the present invention, an apparatus for detecting persons includes an initial-detection unit configured to initially detect the persons in a height-top-view including the persons to be detected; a density estimation unit configured to divide the height-top-view into one or more regions, and estimate crowd density in each of the regions; a visible region determination unit configured to determine, based on the crowd density, visible regions of the initially detected persons in each of the regions; a feature extraction unit configured to extract, for each of the initially detected persons, a first gradient feature of the person from the height-top-view and a second gradient feature of the person from a grayscale image or a color image corresponding to the height-top-view, respectively; a confidence level determination unit configured to determine, for each of the initially detected persons, based on the extracted first gradient feature and second gradient feature, using a previously constructed classifier corresponding to the determined visible region of the person, a confidence level of the initially detected person; and a correction unit configured to correct, based on the confidence level, a detection result of the initially detected persons.

According to the technology of detecting the persons according to embodiments of the present invention, different classifiers, such as a head classifier, a head-shoulder classifier and a complete body classifier, are used based on different crowdedness degrees to correct an initial detection result. By this way, each of the persons can be accurately detected even when human bodies are mutually shielded due to crowdedness, and a relatively good detection result can be obtained for each region, when shielding degrees of the human bodies are different due to different crowdedness degrees of the regions in a detection range.

BRIEF DESCRIPTION OF THE DRAWINGS

The above aspects and merits and/or other aspects and merits of the present invention will become more apparent from the following detailed description of the embodiments of the present invention when read in conjunction with the accompanying drawings. The drawings are provided for further explaining the embodiments of the present invention, and are a part of the specification. The drawings are used to explain the present invention together with the embodiments of the present invention, and the present invention is not limited to the drawings. In the drawings, the same reference symbols usually represent the same units or steps.

FIG. 1 is a flowchart illustrating a person detecting method according to an embodiment of the present invention;

FIG. 3 is a flowchart illustrating processing of dividing the height-top-view into one or more regions and estimating crowd density in each of the regions based on a regression method;

FIG. 4A is a schematic drawing illustrating arrangement scenes of a crowd of three examples, FIG. 4B is a schematic drawing illustrating height-top-views corresponding to the arrangement scenes of the crowd shown in FIG. 4A, and FIG. 4C is a schematic drawing illustrating extraction results of a LBP feature from the height-top-views shown in FIG. 4B;

FIG. 5 is a flowchart illustrating processing of extracting, for an initially detected person, a first gradient feature and a second gradient feature of the person from the height-top-view, and a corresponding grayscale image or a corresponding color image;

FIG. 8 is a schematic drawing illustrating the overall hardware configuration of a person detecting system according to an embodiment of the present invention.

DETAILED DESCRIPTION OF THE PREFERRED EMBODIMENTS

Figure 2A:
FIGS. 2A and 2B are schematic drawings respectively illustrating a grayscale image of a photographed scene, and a detection result obtained by initially detecting the persons in a height-top-view corresponding to the grayscale image.

In the following, embodiments of the present invention are described in detail with reference to the accompanying drawings, so as to facilitate the understanding of the present invention. The embodiments in the present invention, and another embodiment made by persons skilled in the art without creative work belong to the scope of the present invention.

First, technical terms mentioned in the description will be introduced briefly.

It is well known that the grayscale image is a monochromatic image with a plurality of grayscale color ranges or a plurality of grayscale levels from black to white. Each pixel in the image is usually represented by 8-bit data, accordingly the image may have 256 kinds of grayscale levels. In the color image, each pixel is usually represented by three components, e.g., red (R), green (G) and blue (B), and the component is within 0 to 255. However, the forming method and the main function of the grayscale image and the color image are similar (both of them are used to represent color information). Thus, even though a grayscale image is used in the following description of embodiments, the grayscale image may be replaced by a color image.

The depth image is an image in which a value of each pixel represents a distance between a point in a scene and a camera. In comparison with the grayscale image (or the color image), the depth image has depth (distance) information, thus the depth image is suitable for various applications requiring stereo information.

The top view, which is also referred to as the "plan view", is a view obtained by performing orthographic projection for an object from top to bottom. The top view includes the area-top-view, the height-top-view and the like. In the present invention, a top view means a height-top-view, where a height value of a highest point in space serves as a pixel value of a corresponding position in a top view, unless there is a specific description. Specifically, in a height-top-view, the higher the height of a highest point in space is, the greater the pixel value is, and the greater the brightness is.

In the following, a method for detecting persons according to an embodiment of the present invention will be described with reference to FIG. 1. FIG. 1 is a flowchart illustrating a person detecting method according to an embodiment of the present invention.

As shown in FIG. 1, in step S110, in a height-top-view including the persons to be detected, the persons are initially detected.

The height-top-view including the persons to be detected may be obtained using any conventional method in the art. For example, as a common method, coordinates of pixels in an image coordinate system, which correspond to pixels in the photographed depth image including the persons to be detected, are transformed into coordinates in a world coordinate system by coordinate transformation, and the transformed pixels in the world coordinate system are mapped into the height-top-view, so as to obtain the height-top-view including the persons to be detected.

The persons may be initially detected in the height-top-view including the persons to be detected by any conventional method in the art. For example, a common method in the art such as a method based on connected component analysis (CCA) division, or a template matching method may be used. As an example, in the article published in 2003, for which the author is Michael Harville, and the title is "Stereo Person Tracking with Adaptive Plan-View Templates of Height and Occupancy Statistics", a method for specifically implementing detection of persons in a height-top-view is provided. It should be noted that, it is necessary for all of the methods to lower a corresponding detection threshold thereby preventing non-detection and achieve higher detection rate. For example, when using a method based on a CCA division, it is necessary to set a size of a division block that is a detection threshold to a relatively small value; and when using a template matching method, it is necessary to set a similarity degree that is a detection threshold to a relatively small value. Accordingly, high false detection rate caused by lowering the corresponding detection threshold may be suppressed by a subsequent step described below.

Figure 2B:
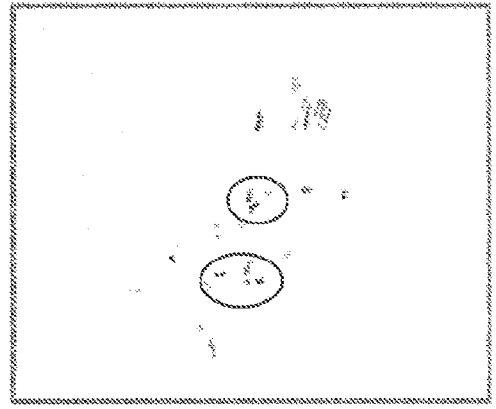

FIGS. 2A and 2B are schematic drawings respectively illustrating a grayscale image of a photographed scene, and a detection result obtained by initially detecting the persons in a height-top-view corresponding to the grayscale image.

In step S120, the height-top-view is divided into one or more regions, and crowd density in each of the regions is estimated.

This step may be implemented by any conventional method in the art. As an example, a method based on clustering may be used. FIG. 2B shows results of performing clustering for the initially detected persons shown in FIG. 2A, where circles show two clustering results. The clustering for the initially detected persons may be performed using any known clustering algorithm in the art, such as a K-MEANS algorithm, a CLARANS algorithm, a BIRCH algorithm or a CURE algorithm. In the embodiment, as an example, a clustering algorithm described in the article published in "Science" magazine of June 2014, for which the authors are lex Rodriguez and Alessandro Laio, and the title is "Clustering by fast search and find of density peak" is used to perform the clustering.

In the method based on clustering, clustering regions obtained by the clustering may serve as the one or more regions obtained by dividing the height-top-view, and for each of the regions, the crowd density in the region may be estimated as shown in expression (1).

$$R = N/A \qquad (1)$$

Where N is the number of the persons initially detected in the region, which is determined based on the initial detection result of step S110, and A is the area of the region.

As another example, this step may be performed using a method based on regression. The method based on regression includes many specific implementation algorithms, and any appropriate specific implementation algorithms may be used here. In the embodiment, as an example, a regression method based on a LBP feature, which is provided by the inventor of the present invention in another Chinese Patent Application No. 201410645077.4 is used. In the following, for complete explanation, this method will be briefly described with reference to FIG. 3.

As shown in FIG. 3, in step 1201, the height-top-view is divided into regions with a predetermined size.

The predetermined size may be previously set based on degree of crowdedness and experience, and for example, the region may be a square region whose side length is 1 meter or 2 meters. In an extreme case, the entire height-top-view may serve as a region. It should be noted that, the height-top-view may not be divided into regions with the same size, and may also be divided into regions with different sizes as necessary.

In step S1202, for each of the regions, density detection feature is extracted. The density detection feature indicates distribution of differences in height between pixels in the region.

Specifically, in this step, for each pixel in each region, the following processing is performed.

(S1) Adjacent pixels J around the pixel P as a center, whose distance from the pixel P is a predetermined distance are determined;

(S2) a pixel value of the pixel P and a pixel value of each adjacent pixel J are compared;

(S3) 1 or 0 is allocated to a value of the adjacent pixel J, as shown in expression (2); and (S4) a binary code composed of the values of the adjacent pixels J is set as a LBP code of the pixel P.

$$g(J) = \begin{cases} 1, & h(P) - h(J) < T \ \& h(J) > H_{min} \\ 0, & \text{else} \end{cases} \quad (2)$$

Where g(J) is the value allocated to the adjacent pixel J, h(P) and h(J) are respectively the pixel value of the center pixel P and the pixel value of the adjacent pixel J in the height-top-view. T and $H_{min}$ are thresholds previously set based on a head-shoulder model of the human body. Specifically, when looking down at a head-shoulder portion of a person, its appearance has a general rule in which center (a head portion) is high and two sides (shoulder portions) are low, because of a human-specific proportion. Here, T represents a difference in height between a highest point of the head portion and highest point of the shoulder portions of a human body, and $H_{min}$ represents a distance from the ground to the highest point of the shoulder portions of the human body. The head-shoulder model of the human body is used to extract the LBP feature as shown in the expression (2), thus the human body can be represented better and the crowd density can be accurately detected.

It should be noted that, a conventional LBP feature is extracted from a grayscale image, and reflects a difference of grayscale values between a center pixel and adjacent pixels; on the other hand, the LBP feature in this step is extracted from a height-top-view, and reflects a difference of height values between a center pixel and adjacent pixels.

Furthermore, as a basic method of the above processing (S4), the binary code composed of the sequentially arranged values of the adjacent pixels is directly set as the LBP code of the pixel. However, according to this method, the binary codes may generate different results after rotation (a cyclic shift). That is to say, if the image rotates, the LBP codes may become different for the same crowd arrangement; thus an adverse impact on the detection result of the crowd density may be caused. Therefore, preferably, rotation-invariant processing for the binary code composed of the sequentially arranged values of the adjacent pixels may be performed, and the binary code after the rotation-invariant processing may be set as the LBP code of the pixel P as shown in expression (3).

$$LBP_{P,R} = \min\{ROR(LBP_{P,R}, i)) | i=0,1, \ldots, P-1\} \quad (3)$$

where P is a length of the binary code, namely the number of the adjacent pixels J around the center pixel P, and it is assumed that P=8 here; R is radius of an adjacent region, namely a distance from adjacent pixels J to the center pixel P, and it is assumed that R=2 here; and ROR is a cyclic shift command, such as ROR(11000000,1)=10000001.

By the rotation-invariant processing as shown in the expression (3), the binary codes with the same coding mode are unified as the same coding result, namely a minimum value in rotation results of the coding mode. For example, the binary codes "10011110" and "11110100" have the same coding mode; accordingly, both of the results of those two binary codes after the rotation-invariant processing are "00111101". By the rotation-invariant processing, the binary codes have rotational invariance; thus, the detection result of the crowd density is the same for whatever orientation of persons, namely the detection of the crowd density has robustness.

When the length of the binary code is 8, there are at most 256 kinds of binary codes; however, after the rotation-invariant processing as shown in the expression (3), there are at most 36 kinds of binary codes, which correspond to the following decimal values.

$$\{LBP_{P,R}\}=\{0,1,3,5,7,9,11,13,15,17,19,21,23,25,27,$$
$$29,31,37,39,43,45,47,51,53,55,59,61,63,85,87,$$
$$91,95,111,119,127,255\}$$

In step S1203, number of persons in each of the regions is detected, based on the LBP feature, using a density model previously constructed by a statistical learning method.

In this step, the LBP codes of the pixels in the region are classified, so that the same LBP codes are classified into the same category; and then, the number of the LBP codes included in each category is determined.

As an example of representation method of the statistical result, for each region, the category of the LBP codes, and the number of the LBP codes included in each category may be represented by a multi-dimensional array, where each element in the array represents an LBP code, and value of the element represents appearing times of the LBP code. The LBP codes to be classified may be the binary code composed of the sequentially arranged values of the adjacent pixels, and may also be the binary code composed of the sequentially arranged values of the adjacent pixels after the rotation-invariant processing. Here, the binary code obtained after the rotation-invariant processing is used.

After the classification and statistical processing for the LBP codes of the pixels in the region, the number of the persons in each region is calculated using the previously constructed density model, based on the categories of the classified LBP codes and the number of the LBP codes included in each category.

The previously constructed density model is obtained by performing training by the statistical learning method, in which the categories of the LBP codes and the number of the LBP codes included in each category serve as independent variables and actual number of persons in regions corresponding to values of the independent variables serves as dependent variables, and the actual number of the persons is obtained by statistical processing in advance. In the following, the density model will be described with reference to FIGS. 4A to 4C.

FIG. 4A illustrates the arrangement scenes of the crowds that respectively include 2, 5 and 12 persons, FIG. 4B illustrates the height-top-views respectively corresponding to the three arrangement scenes of the crowds shown in FIG. 4A, and FIG. 4C illustrates extraction results of a LBP feature from the height-top-views shown in FIG. 4B.

For the extraction results of the LBP features as shown in FIG. 4C, classification and statistical processing is performed for the LBP codes of the pixels as described above, so as to obtain a statistical result of number of categories of the LBP codes in the region and number of the LBP codes included in each category (namely appearing times of the different LBP codes). Accordingly, the categories of the LBP codes and the numbers of the LBP codes included in each category, which respectively correspond to the crowd density of 2 persons, 5 person and 12 persons, can be obtained as training samples. Similarly, for any other crowd density, a statistical result of categories of the LBP codes and number of LBP codes included in each category may be obtained as training samples. After obtaining a certain number of training samples, the density model may be obtained by performing training by the statistical learning method, in which the categories of the LBP codes and the number of the LBP codes included in each category serve as independent variables and the corresponding crowd density (namely the number of persons) serves as dependent variables.

The density model describes a corresponding relationship between the crowd density, and the categories of the corresponding LBP codes and the number of the LBP codes included in each category. Thus, after performing the classification and statistical processing for the LBP codes of pixels in the region, the crowd density corresponding to the categories of the LBP codes and the number of the LBP codes included in each category can be obtained by using the density model.

In step S1204, for each of the regions, the crowd density is calculated, based on the detected number of the persons in the region and area of the region.

In this step, the crowd density of each region may be calculated as shown in expression (4).

$$R=N/A \qquad (4)$$

Where N is number of the persons in each region detected in step S1203, and A is the area of the region.

As examples of the processing in step S120, the method based on clustering and the method based on regression have been described above. It should be noted that, the above methods are just examples for understanding the present invention, and the present invention is not limited to these methods. The processing in step S120 may also be performed by using any conventional methods by persons skilled in the art.

Referring back to FIG. 1, in step S130, visible regions of the initially detected persons in each of the regions are determined, based on the crowd density.

It can be understood that, the greater the crowd density is, the higher the shielding degree between the persons is, and the smaller the visible region of the person is. As an example, it is assumed that, when the crowd density is a high density-level, the shielding degree between the persons is high, and only a head region of the person is visible; when the crowd density is an intermediate density-level, the shielding degree between the persons is slightly low, and a head-shoulder region of the person is visible; and when the crowd density is a low density-level, there is almost no shielding between the persons, and a complete body region of the person is visible.

For the above assumption, in this step, for each of the regions, the crowd density of the region is compared with a first threshold and a second threshold (the first threshold is greater than the second threshold); it is determined that the visible regions of the persons initially detected in the region are head-regions, when the crowd density is greater than or equal to the first threshold; it is determined that the visible regions of the persons initially detected in the region are head-shoulder-regions, when the crowd density is less than the first threshold and is greater than or equal to the second threshold, and it is determined that the visible regions of the persons initially detected in the region are complete regions, when the crowd density is less than the second threshold. The first threshold is a threshold for distinguishing the high density-level and the intermediate density-level, and the second threshold is a threshold for distinguishing the intermediate density-level and the low density-level. The values of the first and second thresholds may be set based on a specific situation such as detection requirement, and for example, the first threshold is 2 person/m$^2$, and second threshold is 0.75 person/m$^2$.

It should be noted that, classifying the crowd density into the above high, intermediate and low density-levels is just an example, and the crowd density may also be classified into more than 3 or less than 3 density-levels. For example, the crowd density may also be four density-levels further including an intermediate-low density level besides the high, intermediate and low density-levels, which indicates that an upper half part of a human body is visible. Meanwhile, the above assumption of the visible regions of the person corresponding to the density-levels is just an example, and another assumption may also be used. For example, the crowd density may be classified into only two density-levels, namely the high density-level and the intermediate density-level, and it is assumed that the head region of the person is visible in a case of the high density-level, and the upper half part of human body is visible in a case of the intermediate density-level.

In step S140, for each of the initially detected persons, a first gradient feature and a second gradient feature of the person are respectively extracted from the height-top-view, and a grayscale image or a color image corresponding to the height-top-view.

An object of respectively extracting the first and second gradient features of the person from the height-top-view, and the corresponding grayscale image or color image is to obtain both depth gradient information and color gradient information of the person. The present invention is not limited to the types of the first and second gradient features, and persons skilled in the art may use appropriate features, such as LBP features, Haar features, Harris features, or HOG features based on specific situations. In the embodiment, as an example, a LBP (Local Binary Pattern) histogram is used as the first gradient feature, and a HOG (Histogram of Oriented Gradients) feature is used as the second gradient feature.

In the following, processing of this step will be described in detail with reference to FIG. 5. FIG. 5 is a flowchart illustrating processing of extracting, for an initially detected person, a first gradient feature and a second gradient feature of the person from the height-top-view, and a corresponding grayscale image or a corresponding color image. That is to say, for each of the initially detected persons, the processing shown in FIG. 5 is performed.

As shown in FIG. 5, in step S1401, the first gradient feature is extracted from a region of the height-top-view, which includes the initially detected person.

As described above, in step S120, the height-top-view is divided into one or more regions; accordingly, in step S1401, the first gradient feature is extracted from the region including the initially detected person. For example, when the height-top-view is divided into one or more clustering regions by clustering in step S120, the first gradient feature is extracted from the clustering region including the initially detected person in step S1401; and when the height-top-view is divided into one or more regions with a predetermined size in step S120, the first gradient feature is extracted from the region with the predetermined size, which includes the initially detected person.

As mentioned above, in the embodiment, the LBP histogram is used as the first gradient feature. The histogram is a figure of statistical reporting, which uses a series of vertical bins or line segments with different heights to represent distribution of data. Usually, the horizontal axis represents data type, and the vertical axis represents distribution. As an example, a LBP histogram may be formed based on the above representing method of a multi-dimensional array of the LBP codes, namely, the horizontal axis of the histogram represents the LBP codes in the region, and the vertical axis of the histogram represents the appearing times of the LBP codes in the region. Here, The LBP codes may be the binary code composed of the sequentially arranged values of the adjacent pixels, and may also be the binary code composed of the sequentially arranged values of the adjacent pixels after the rotation-invariant processing. It should be noted that, using the LBP histogram as the first gradient feature is not limited the case where the height-top-view is divided into the regions with a predetermined size in step S120, and may also be applied to the case where the height-top-view is divided into one or more clustering regions by clustering, or another method of dividing the height-top-view.

In step S1402, a position of the initially detected person in the corresponding grayscale image or color image, and a circumscribed rectangle of the complete and initially detected person are determined, based on a position and a pixel value of a highest point of the initially detected person in the height-top-view, by coordinate transformation.

The method of obtaining position information of an initially detected person in the corresponding grayscale image or color image based on position information of the person in the height-top-view by coordinate transformation is known in the art. Here, for completeness of description, the processing of the coordinate transformation will be briefly described below.

The position and the pixel value of the highest point (top of the head) of the initially detected person in the height-top-view, by coordinate transformation are known; accordingly, position coordinates of the highest point in a camera coordinate system (X,Y,Z) may be obtained by known coordinate transformation, and then the position of the highest point in the grayscale image or color image may be calculated according to the following expression (5).

$$\text{HEAD\_}X = X/(Z/fx) + centerU;$$

$$\text{HEAD\_}Y = Y/(Z/fy) + centerV; \quad (5)$$

Where HEAD_X and HEAD_Y represent pixel position of the highest point (top of the head) of the person in the grayscale image or color image, and fx, fy, center and center are camera-specific internal parameters.

Furthermore, the pixel position of a lowest point (sole of the foot) of the person in the grayscale image or color image may be calculated according to the following expressions (6)-(8).

$$\begin{bmatrix} X_W \\ Y_W \\ Z_W \end{bmatrix} = R \begin{bmatrix} X \\ Y \\ Z \end{bmatrix} + T \quad (6)$$

Where R and T are each a matrix of external parameters, (X,Y,Z) represents the position of the highest point of the person in the camera coordinate system, $(X_w, Y_w, Z_w)$ represents a position of the highest point in a world coordinate system where X-Z plane overlaps the ground, and Y-axis is perpendicular to the ground. It can be understood that, $Y_w$ represents a height of the person in a true world.

$$\begin{bmatrix} X_C \\ Y_C \\ Z_C \end{bmatrix} = R^T \left( \begin{bmatrix} X_W \\ 0 \\ Z_W \end{bmatrix} - T \right) \quad (7)$$

Where $(X_w, 0, Z_w)$ represents a position of the lowest point of the initially detected person in the world coordinate system, and $(X_w, Y_w, Z_w)$ represents a position of the lowest point of the person in the camera coordinate system.

$$\text{FOOT\_}X = Xc/(Zc/fx) + centerU;$$

$$\text{FOOT\_}Y = Yc/(Zc/fy) + centerV; \quad (8)$$

FOOT_X and FOOT_Y represent pixel position of the lowest point (sole of the foot) of the person in the grayscale image or color image, and fx, fy, centerU and centerV are camera-specific internal parameters. It should be noted that, the lowest point may be invisible in the grayscale image or color image because of the shielding of the person. In this case, the calculated FOOT_X and FOOT_Y are the theoretical pixel position of the lowest point in the grayscale image or color image when the lowest point is not shielded.

Accordingly, the position of the person in the corresponding grayscale image or color image may be determined based on the above HEAD_X, HEAD_Y, FOOT_X and FOOT_Y.

For convenience of displaying in the image, a size of a circumscribed rectangle of the person in the grayscale image or color image may be calculated according to expression (9), so as to represent the person by the circumscribed rectangle.

$$w = \text{BODY\_}W * fx/Z$$

$$h = \text{FOOT\_}Y - \text{HEAD\_}Y \quad (9)$$

Where BODY_W is a constant of the width of an actual human body, and for example, usually may be set to BODY_W=40 cm; and fx is one of camera internal parameters. It can be understood that, the portion enclosed by the circumscribed rectangle may include a part of the body of another person rather than a complete body of the person.

Figure 6:
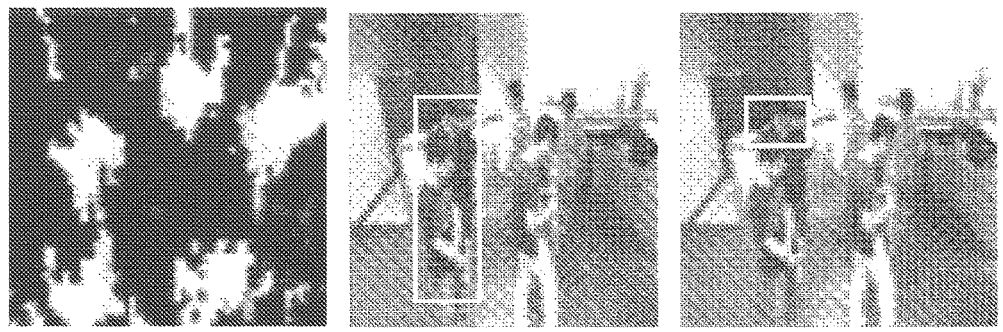
FIG. 6 is a schematic drawing illustrating a circumscribed rectangle of the person, which is initially detected in the height-top-view, in the corresponding grayscale image or the corresponding color image.

FIG. 6 is a schematic drawing illustrating a circumscribed rectangle of the person, which is initially detected in the height-top-view, in the corresponding grayscale image or the corresponding color image. Specifically, the leftmost drawing of FIG. 6 is a height-top-view, the intermediate and right drawings are corresponding grayscale images. The rectangle in the intermediate drawing is a circumscribed rectangle of an initially detected person. As shown in FIG. 6, the circumscribed rectangle includes a part of the body of another person due to shielding of the person.

In step S1403, a portion of the circumscribed rectangle, which corresponds to the visible region of the initially detected person is determined.

As described above, the circumscribed rectangle may include a part of the body of another person because of the shielding of the person. In this step, the portion of the circumscribed rectangle, which corresponds to the visible region of the initially detected person is determined to adjust the circumscribed rectangle, so that the circumscribed rectangle includes only the initially detected person. For example, it is assumed that the visible region of the initially detected person is the head-shoulder region, and it can be known that the height of the head-shoulder region is about 24% of the height of the person based on an average ratio of the human body; accordingly, it may be determined that the portion of the circumscribed rectangle, which corresponds to the visible region, is top 24% region of the circumscribed rectangle. As another example, it is assumed that the visible region of the initially detected person is the head region, and it can be known that the height of the head is about ⅛ of the height of the person based on the average ratio of the human body; accordingly, it may be determined that the portion of the circumscribed rectangle, which corresponds to the visible region, is top ⅛ region of the circumscribed rectangle. For example, the rectangle in the rightmost drawing of FIG. 6 shows the portion of the circumscribed rectangle which corresponds to the visible region when the visible region of the person is the head-shoulder region.

In step S1404, the second gradient feature is extracted from the corresponding portion of the circumscribed rectangle in the corresponding grayscale image or color image.

As mentioned above, in the embodiment, the HOG (Histogram of Oriented Gradients) feature is used as the second gradient feature. In this step, the HOG feature is extracted from the corresponding portion of the circumscribed rectangle determined in step S1403. The HOG feature is a known image feature of the field of image processing, and the extraction of the HOG feature from the image also is a common image processing method; accordingly, the descriptions are omitted here.

Referring back to FIG. 1, in step S150, for each of the initially detected persons, a confidence level of the initially detected person is determined, based on the extracted first gradient feature and second gradient feature, using a previously constructed classifier corresponding to the determined visible region of the person.

The classifier is obtained by previous training using the first and second gradient features. The training method of the classifier for selected image feature is known in the art, and the description is omitted here. It should be noted that, in the embodiment, different classifiers are respectively trained for different visible regions of the person. For example, when the predetermined visible regions of the person are a head-region, a head-shoulder-region, and a complete region, a classifier corresponding to the head-region of the person is obtained by training using training samples of the head-region serving as the visible region of the person, a classifier corresponding to the head-shoulder-region of the person is obtained by training using training samples of the head-shoulder-region serving as the visible region of the person, and a classifier corresponding to the complete region of samples of the complete region serving as the visible region of the person, respectively. It should be noted that, if different dividing methods of the visible regions are used, the classifiers may be accordingly obtained by training based on the corresponding visible regions determined by the dividing methods. For example, when the predetermined visible regions of the person are the head-region and an upper-half-part-region, the classifier corresponding to the head-region of the person and the classifier corresponding to the upper-half-part-region may be accordingly obtained by training.

After the classifiers are obtained by training, for each of the initially detected persons, the confidence level of the person may be determined, based on a similarity score, which is given by the classifiers based on the first and second gradient features. Here, the confidence level represents a reliable level that the initially detected person truly is a person to be detected (namely correct detection). It can be understood that, the greater the similarity score given by the classifier is, the higher the reliable level that the initially detected person truly is a correct detection, is, namely the greater the confidence level is. Specifically, as an example, in this step, for each of the initially detected persons, the first and second gradient features, which are extracted for the person, are input in the classifier corresponding to the determined visible region of the person, and the similarity score given by the classifier is regarded as the confidence level p(x) of the initially detected person.

In step S160, a detection result of the initially detected persons is corrected based on the confidence level.

In this step, the detection result of the initially detected persons may be corrected based on the confidence level using any appropriate method.

For example, as a most basic method, the confidence level of the initially detected person may be compared with a confidence level threshold; it may be determined that the initially detected person is the person to be detected (namely, correct detection), when the confidence level is greater than or equal to the confidence level threshold; and it may be determined that the initially detected person is false detection, when the confidence level is less than the confidence level threshold. As an example, the detection result of the initially detected persons may be corrected based on the confidence level according to expression (10).

$$x = \begin{cases} 1, & \text{if } (p(x) > Threshold_C) \\ 0, & \text{else} \end{cases} \quad (10)$$

Where x=1 represents that the initial detection result is a correct detection, namely the initially detected person is a person to be detected, otherwise it is determined that the initial detection result is a false detection. $Threshold_C$ is the confidence level threshold, which may be set based on specific requirement, and for example, may be set to $Threshold_C$=0.75.

Preferably, it is considered that the accuracy of the detection result relates to the estimation result of the crowd density in each region in above step S120; accordingly, the detection result may also be corrected based on both the crowd density of the region and the confidence level.

Specifically, for each of the regions, the corrected detection result of the person may be obtained by obtaining a solution of an optimization problem shown in expression (11).

$$\min_{x_1 \in \{0,1\}} (D - \|X\| - X' \times p(X)) \quad (11)$$

where D represents the crowd density in the region estimated in above step S120 by the method based on regression, X is vector representation of the person detected in the region and the initial value of X is vector representation of the person initially detected in the region, $X_i$ is an i-th element in the vector X, and p(X) is a confidence level vector of the person initially detected in the region. For example, if it is assumed that 3 persons are initially detected in a region and the confidence levels of the 3 persons respectively are 0.9, 0.7 and 0.2, the initial vector $$X = \begin{bmatrix} 1 \\ 1 \\ 1 \end{bmatrix},$$

and vector $$p(X) = \begin{bmatrix} 0.9 \\ 0.7 \\ 0.2 \end{bmatrix}.$$

The optimization goal of the first item D−‖X‖ above expression (11) is to reduce the difference between the estimation result of the density level and the detection result of the persons, the optimization goal of the second item X'×p(X) is to retain the initial detection result of the persons with a high confidence level.

By obtaining the solution of optimization problem in expression (11), an optimal solution of X can be obtained as the corrected detection result of the persons. The solution of expression (11) may be obtained by any appropriate method such as a greedy algorithm iterative solving method.

The method for detecting the persons according to the embodiment of the present invention was described above with reference to the drawings. In the method, different classifiers, such as a head classifier, a head-shoulder classifier and a complete body classifier, are used based on different crowdedness degrees to correct an initial detection result. By this way, each of the persons can be accurately detected even when human bodies are mutually shielded due to crowdedness, and a relatively good detection result can be obtained for each region, when shielding degrees of the human body are different due to different crowdedness degrees of the regions in a detection range.

Figure 7:
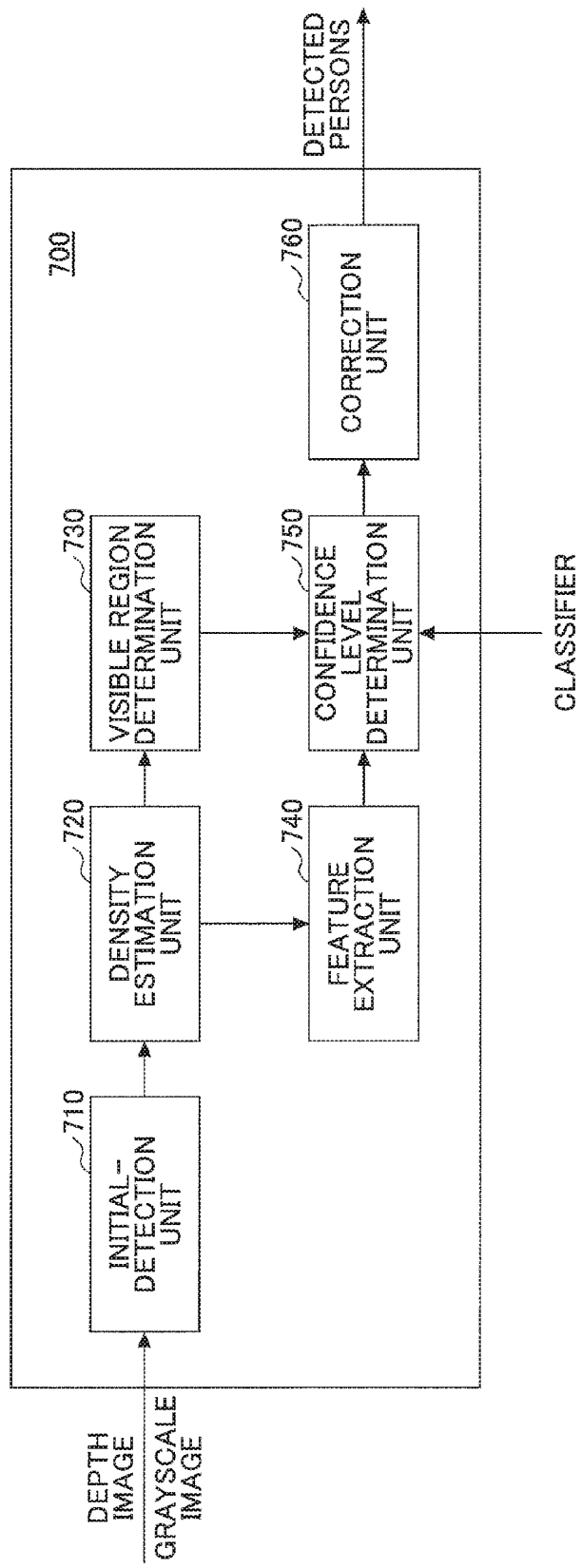
FIG. 7 is a block diagram illustrating a functional configuration of a person detecting apparatus according to an embodiment of the present invention.

In the following, an apparatus for detecting persons according to an embodiment of the present invention will be described with reference to FIG. 7. FIG. 7 is a block diagram illustrating a functional configuration of a person detecting apparatus according to an embodiment of the present invention.

As shown in FIG. 7, a person detecting apparatus 700 may include an initial-detection unit 710 configured to initially detect the persons in a height-top-view including the persons to be detected; a density estimation unit 720 configured to divide the height-top-view into one or more regions, and estimate crowd density in each of the regions; a visible region determination unit 730 configured to determine, based on the crowd density, visible regions of the initially detected persons in each of the regions; a feature extraction unit 740 configured to extract, for each of the initially detected persons, a first gradient feature and a second gradient feature of the person from the height-top-view, and a grayscale image or a color image corresponding to the height-top-view, respectively; a confidence level determination unit 750 configured to determine, for each of the initially detected persons, based on the extracted first gradient feature and second gradient feature, using a previously constructed classifier corresponding to the determined visible region of the person, a confidence level of the initially detected person; and a correction unit 760 configured to correct, based on the confidence level, a detection result of the initially detected persons.

Preferably, the visible region determination unit 730 may further include a comparison unit configured to compare the crowd density of the region with a first threshold and a second threshold, the first threshold being greater than the second threshold; and a determination unit configured to determine that the visible regions of the persons initially detected in the region are head-regions, when the crowd density is greater than or equal to the first threshold, determine that the visible regions of the persons initially detected in the region are head-shoulder-regions, when the crowd density is less than the first threshold and is greater than or equal to the second threshold, and determine that the visible regions of the persons initially detected in the region are complete regions, when the crowd density is less than the second threshold.

Preferably, the feature extraction unit 740 may further include a first feature extraction unit configured to extract the first gradient feature from a region, which includes the initially detected person, of the height-top-view, a position determination unit configured to determine, based on a position and a pixel value of a highest point of the initially detected person in the height-top-view, by coordinate transformation, a position of the initially detected person in the corresponding grayscale image or color image, and a circumscribed rectangle of the complete and initially detected person, a position adjustment unit configured to determine a portion, which corresponds to the visible region of the initially detected person, of the circumscribed rectangle, and a second feature extraction unit configured to extract, from the corresponding portion of the circumscribed rectangle in the corresponding grayscale image or color image, the second gradient feature.

Preferably, the classifier used by the confidence level determination unit 750 is obtained by training using the first gradient feature and the second gradient feature, and the classifier includes a classifier corresponding to a head-region of a person, a classifier corresponding to a head-shoulder-region of a person, and a classifier corresponding to a complete region of a person.

Specific functions and operations of the initial-detection unit 710, the density estimation unit 720, the visible region determination unit 730, the feature extraction unit 740, the confidence level determination unit 750, the correction unit 760, the comparison unit, the determination unit, the first feature extraction unit, the position determination unit, the position adjustment unit, and the second feature extraction unit described above may refer to the description relating to FIGS. 1 to 6, and the description thereof is omitted here.

FIG. 8 is a schematic drawing illustrating the overall hardware configuration of a person detecting system 800 according to an embodiment of the present invention.

As shown in FIG. 8, the person detecting system 800 may include: an input apparatus 810 for inputting images or information from the outside, such as a depth image photographed by a camera, a grayscale image (a color image) or the like, for example, which may include a keyboard, a mouse, a camera, etc.; a processing apparatus 820 for implementing the above method for detecting persons according to the embodiment or the above apparatus for detecting persons according to the embodiment of the present invention, which may include the CPU of a computer or other chips having processing ability, etc.; an output apparatus 830 for outputting a result of the above detection, such as positions of the detected persons, which may include a screen, a printer, etc.; and a storage apparatus 840 for storing depth images, grayscale images (color images), the detection result of the initially detected persons, crowd density of the regions, the visible regions of the initially detected persons, thresholds, the first gradient feature, the second gradient feature, previously trained classifiers, the confidence levels, etc., by a volatile method or a nonvolatile method, which may include various kinds of volatile or nonvolatile memory including a random-access memory (RAM), a read-only memory (ROM), a hard disk and a semiconductor memory.

The basic principle is described with reference to the above specific embodiments. It should be noted that, the advantage or effect described above is just an example, and the embodiments are not limited to the advantage or effect. The above descriptions of the embodiments are just examples, and various modifications, replacements or combinations may be made without departing from the scope of the present invention by persons skilled in the art.

The block diagrams of the units, apparatuses, devices and system are just examples, the connection, placement and configuration illustrated in the block diagrams related to the present invention are not limited to these examples, and the units, apparatuses, devices and system may be connected, placed or configured in any way. The terms "comprise", "include" and "have" are open-form terms, which mean and may be changed into "include and is not limited to". The terms "or" and "and" mean and may be changed into "and/or", unless the context is clearly not. The term "such as" means and may be changed to "such as, but not limited to".

The flowchart and the method according to the present invention are just examples, and not limited to the steps in the embodiments. The steps of the embodiments may be performed in any order. The terms "next", "subsequently" and "then" are just for describing the present invention, and the present invention is not limited to these terms. Furthermore, the articles "a", "an" and "the" should not be limited to the singular element.

Furthermore, the term "or" before the term "at least one" means a separate enumerating, and for example, "at least one of A, B or C" means (1) A, B or C, (2) AB, AC or BC, or (3) ABC (namely, A and B and C). Additionally, the term "example" does not mean a preferable example or an example superior to other examples.

It should be noted that, in the apparatus and method of the embodiments, each unit or each step may be divided and/or recombined. The division and/or recombination may be equivalents of the embodiments.

The present specification and the appended claims includes other examples and implementations. For example, the above functions may be implemented by a processor, hardware, software, firmware, hard-wire or any combination thereof. The features for implementing the functions may be located at any physical position where which is distributed to each position physically. The present invention may use a general-purpose processor, a digital signal processor (DSP), an ASIC, a field programmable gate array (FPGA) or other programmable logic device (PLD), a discrete gate or transistor logic, discrete hardware components or any other combination for executing the functions to realize the logic blocks, modules and circuits of the embodiments. The general-purpose processor is a micro-processor, and alternatively, the processor may be any processors, controllers, micro-controllers or state machines that can be obtained commercially. The processor may also be the combination of the computer equipment, such as the combination of a DSP and a micro-processor, the combination of plural micro-processors, or the combination of a DSP and plural micro-processors. When the function is implemented by software, the function may be stored in a computer-readable medium as one or more commands. The recording medium may be any real medium that can be accessed by a computer. Such a computer-readable medium includes a RAM, a ROM, an EEPROM, a CD-ROM or other laser discs, a magnetic disk or other magnetic memory, or any other real media that carry or store commands, data or program codes and are accessed by the computer. Such disk and disc include a CD, a laser disc, an optical disc, a DVD disc, a floppy disk and a blue-ray disc, and the disk usually reproduces data and the disc reproduces data by a laser.

The operations may be performed by a computer program product. For example, such computer program product may be a tangible medium where computer-readable commands are stored (or coded), and the commands may be executed by one or more processors to perform the operation. The computer program product may include packaging material.

Various modifications, replacements or combinations may be made without departing from the scope of the present invention by persons skilled in the art. Furthermore, the scope of the present specification and the claims are not limited to the above processing, machine, manufacture, composition of events, means, method and operation. The processing, machine, manufacture, composition of events, means, method and operation with a similar function or a similar result may also be applied to the present invention. Therefore, the scope of the appended claims include such processing, machine, manufacture, composition of events, means, method and operation.

The method or apparatus of the present invention are described above. The above descriptions of the embodiments are just examples, and various modifications, replacements or combinations may be made without departing from the scope of the present invention by persons skilled in the art.

The present application is based on and claims the benefit of priority of Chinese Priority Application No. 201510237672.9 filed on May 12, 2015, the entire contents of which are hereby incorporated by reference.

What is claimed is:

1. A method for detecting persons, the method comprising:
   initially detecting the persons in a height-top-view including the persons to be detected;
   dividing the height-top-view into one or more regions, and estimating crowd density in each of the regions;
   determining, based on the crowd density, visible regions of the initially detected persons in each of the regions;

for each of the initially detected persons, extracting a first gradient feature of the person from the height-top-view, and a second gradient feature of the person from a grayscale image or a color image corresponding to the height-top-view, respectively;

for each of the initially detected persons, determining, based on the extracted first gradient feature and second gradient feature, using a previously constructed classifier corresponding to the determined visible region of the person, a confidence level of the initially detected person; and correcting, based on the confidence level, a detection result of the initially detected persons.

2. The method for detecting persons according to claim 1, wherein dividing the height-top-view into one or more regions and estimating the crowd density in each of the regions further includes performing clustering for the persons initially detected in the height-top-view to form one or more clustering regions, and for each of the clustering regions, calculating, based on a number of the persons initially detected in the clustering region and area of the clustering region, the crowd density.

3. The method for detecting persons according to claim 1, wherein dividing the height-top-view into one or more regions and estimating the crowd density in each of the regions further includes dividing the height-top-view into regions with a predetermined size, for each of the regions, extracting a density detection feature, the density detection feature indicating distribution of differences in height between pixels in the region, detecting, based on the density detection feature, using a density model previously constructed by a statistical learning method, a number of persons in each of the regions, and for each of the regions, calculating, based on the detected number of the persons in the region and area of the region, the crowd density.

4. The method for detecting persons according to claim 1, wherein determining the visible regions of the initially detected persons in each of the regions based on the crowd density further includes, for each of the regions comparing the crowd density of the region with a first threshold and a second threshold, the first threshold being greater than the second threshold, determining that the visible regions of the persons initially detected in the region are head-regions, when the crowd density is greater than or equal to the first threshold, determining that the visible regions of the persons initially detected in the region are head-shoulder-regions, when the crowd density is less than the first threshold and is greater than or equal to the second threshold, and determining that the visible regions of the persons initially detected in the region are complete regions, when the crowd density is less than the second threshold.

5. The method for detecting persons according to claim 1, wherein for each of the initially detected persons, extracting the first gradient feature of the person from the height-top-view, and the second gradient feature of the person from the grayscale image or the color image corresponding to the height-top-view, respectively includes extracting the first gradient feature from a region, which includes the initially detected person, of the height-top-view, determining, based on a position and a pixel value of a highest point of the initially detected person in the height-top-view, by coordinate transformation, a position of the initially detected person in the corresponding grayscale image or color image, and a circumscribed rectangle of the complete and initially detected person, determining a portion, which corresponds to the visible region of the initially detected person, of the circumscribed rectangle, and extracting, from the corresponding portion of the circumscribed rectangle in the corresponding grayscale image or color image, the second gradient feature.

6. The method for detecting persons according to claim 5, wherein the first gradient feature is a LBP (Local Binary Pattern) histogram, and the second gradient feature is a HOG (Histogram of Oriented Gradients) feature.

7. The method for detecting persons according to claim 1, wherein the classifier is obtained by training using the first gradient feature and the second gradient feature, and the classifier includes a classifier corresponding to a head-region of a person, a classifier corresponding to a head-shoulder-region of a person, and a classifier corresponding to a complete region of a person.

8. The method for detecting persons according to claim 1, wherein correcting the detection result of each of the initially detected persons based on the confidence level includes comparing the confidence level of the initially detected person with a confidence level threshold, determining that the initially detected person is the person to be detected, when the confidence level is greater than or equal to the confidence level threshold, and determining that the initially detected person is a false detection, when the confidence level is less than the confidence level threshold.

9. The method for detecting persons according to claim 3, wherein correcting the detection result of the initially detected persons based on the confidence level includes for each of the regions, obtaining a solution of an optimization equation $$\min_{x_i \in [0,1]} (D - \|X\| - X' \times p(X))$$

to obtain the corrected detection result of the persons, where D represents the crowd density in the region, X is vector representation of the person initially detected in the region, $X_i$ is an i-th element in the vector X, and p(X) is a confidence level vector of the person initially detected in the region.

10. An apparatus for detecting persons, the apparatus comprising:

an initial-detection unit configured to initially detect the persons in a height-top-view including the persons to be detected;

a density estimation unit configured to divide the height-top-view into one or more regions, and estimate crowd density in each of the regions;

a visible region determination unit configured to determine, based on the crowd density, visible regions of the initially detected persons in each of the regions;

a feature extraction unit configured to extract, for each of the initially detected persons, a first gradient feature of the person from the height-top-view and a second gradient feature of the person from a grayscale image or a color image corresponding to the height-top-view, respectively;

a confidence level determination unit configured to determine, for each of the initially detected persons, based on the extracted first gradient feature and second gradient feature, using a previously constructed classifier corresponding to the determined visible region of the person, a confidence level of the initially detected person; and a correction unit configured to correct, based on the confidence level, a detection result of the initially detected persons.

11. A non-transitory computer-readable recording medium having stored therein a program for causing a computer to execute a process for detecting persons, the process comprising:

initially detecting the persons in a height-top-view including the persons to be detected;

dividing the height-top-view into one or more regions, and estimating crowd density in each of the regions;

determining, based on the crowd density, visible regions of the initially detected persons in each of the regions;

for each of the initially detected persons, extracting a first gradient feature of the person from the height-top-view, and a second gradient feature of the person from a grayscale image or a color image corresponding to the height-top-view, respectively;

for each of the initially detected persons, determining, based on the extracted first gradient feature and second gradient feature, using a previously constructed classifier corresponding to the determined visible region of the person, a confidence level of the initially detected person; and correcting, based on the confidence level, a detection result of the initially detected persons.

* * * * *